Aug. 4, 1964

J. CHERNICK ETAL 3,143,478

HIGH FLUX BEAM REACTOR

Filed May 5, 1961

INVENTORS
JACK CHERNICK
KENNETH W. DOWNES
JULIUS M. HASTINGS
JOSEPH M. HENDRIE
HERBERT J.C. KOUTS

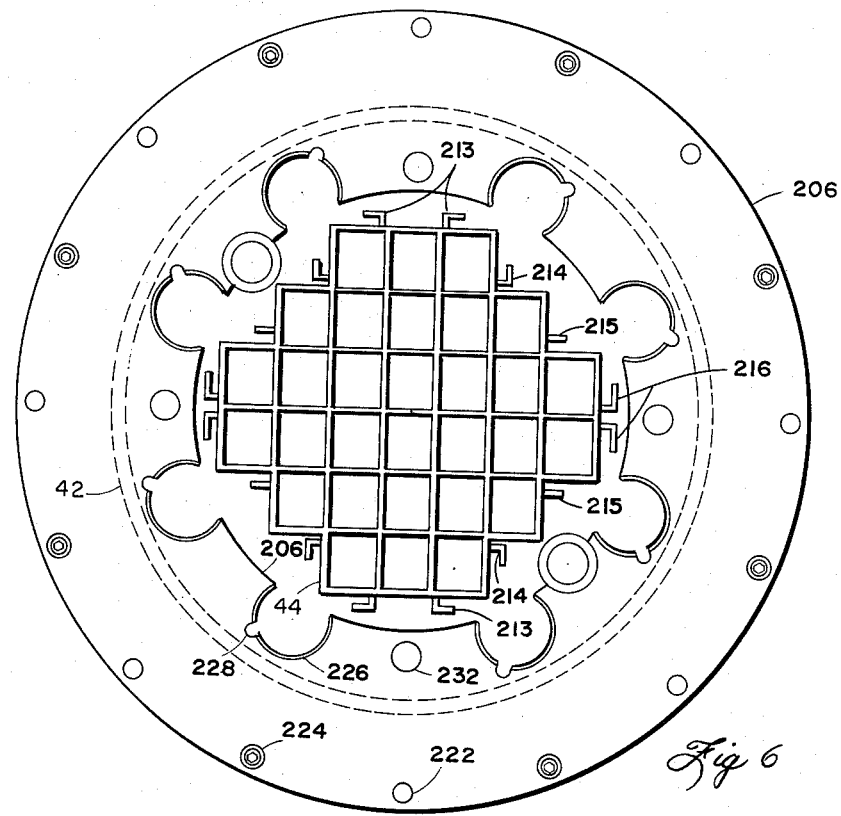
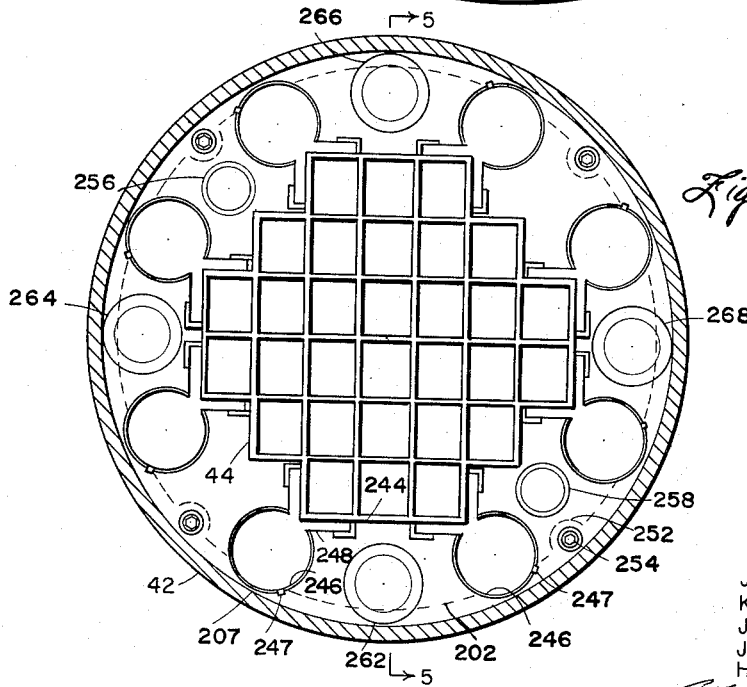

United States Patent Office 3,143,478
Patented Aug. 4, 1964

3,143,478
HIGH FLUX BEAM REACTOR
Jack Chernick, Patchogue, Kenneth W. Downes, Setauket, Julius M. Hastings, Patchogue, Joseph M. Hendrie, Bellport, and Herbert J. C. Kouts, Brookhaven, N.Y., assignors to the United States of America as represented by the United States Atomic Energy Commission
Filed May 5, 1961, Ser. No. 108,212
8 Claims. (Cl. 176—18)

The present invention relates to a high flux neutron beam reactor and more particularly to a nuclear reactor for use as a source of external beams of high intensity neutrons.

During recent years, the need for increasingly higher intensity external neutron beams in connection with advanced basic research projects has been growing steadily. Research nuclear reactors presently in existence are used to produce neutron beams in connection with such projects; however, the intensities of such beams are limited by the designs of the reactors which have requirements other than high intensity external beams.

There are various kinds of experiments which are in great need of stronger neutron source intensities. They include fast chopper resonance measurements, low temperature nuclear alignment experiments using neutrons in the resonance region, diffraction measurements, polarized neutron experiments, and cold neutron experiments in which neutrons are scattered from a cold moderator to obtain neutrons of low energy. A second line of experiments requiring increased source intensities are those concerned with radiation effects. Basic work is in progress on such topics as enhanced diffusion, phase changes and precipitation. In general, these experiments require fluxes in the range of $10^{14}$ to $10^{15}$ neutrons/cm.$^2$/sec. above 300 kilovolts energy. Further, studies of the cross sections and level structures of higher isotopes would benefit greatly from an increased thermal flux available for irradiating samples. Finally, as progress is made on existing and projected research projects involving the use of high intensity neutron beams, it is to be expected that new avenues of investigation will be opened requiring the further increased use of neutron beams of even higher intensities.

This invention helps to meet the developing needs for high intensity neutron sources by providing a nuclear reactor capable of producing neutron beams of a wide range of energies with intensities heretofore not generally available. In order to obtain these desired and other important results, this reactor, in accordance with the principles of this invention, embodies a unique arrangement in which the fissionable material consists of fully enriched U-235 alloyed in aluminum as structural plate material, and heavy water, or D$_2$O, is utilized to perform all the functions of moderator, coolant, and reflector. The core itself is under-moderated so that most of the neutron thermalization occurs in the surrounding reflector region where maximum thermal fluxes therefore occur. To permit beams of thermal neutrons to be extracted from the reflector with a fairly low background of fast neutrons, the peak epithermal and thermal fluxes in the reactor core and reflector, respectively, are caused to be spatially separated in accordance with this design. This separation is achieved by the use of the D$_2$O in a specific arrangement to under-moderate the core, as mentioned above. As an additional result of this arrangement, epithermal neutron beams may be taken from the interface of the core and the reflector, and a relatively pure fast neutron flux is available inside the core for radiation damage experiments.

It is, therefore, a first object of this invention to provide a spatially separated source of high intensity beams of epithermal and thermal neutrons.

It is a further object of this invention to provide a nuclear reactor for producing high intensity external beams of thermal neutrons.

Another object is to provide a unique nuclear reactor construction in which D$_2$O functions as coolant, moderator and reflector.

Still another object of this invention is to provide a nuclear reactor having an under-moderated core of fully enriched U-235, externally moderated by a heavy water moderator, reflector and coolant region for establishing thermal flux peaks in that region.

Other objects and advantages of this invention will hereinafter become more evident as a result of the following description of a preferred embodiment of this invention made with reference to the accompanying drawings in which:

FIG. 6 is a view along 6—6 of FIG. 1;

FIG. 7 is a section view along 7—7 of FIG. 5; and

FIG. 8 is an isometric view partially cut away of a fuel element used in this reactor.

Figure 1:
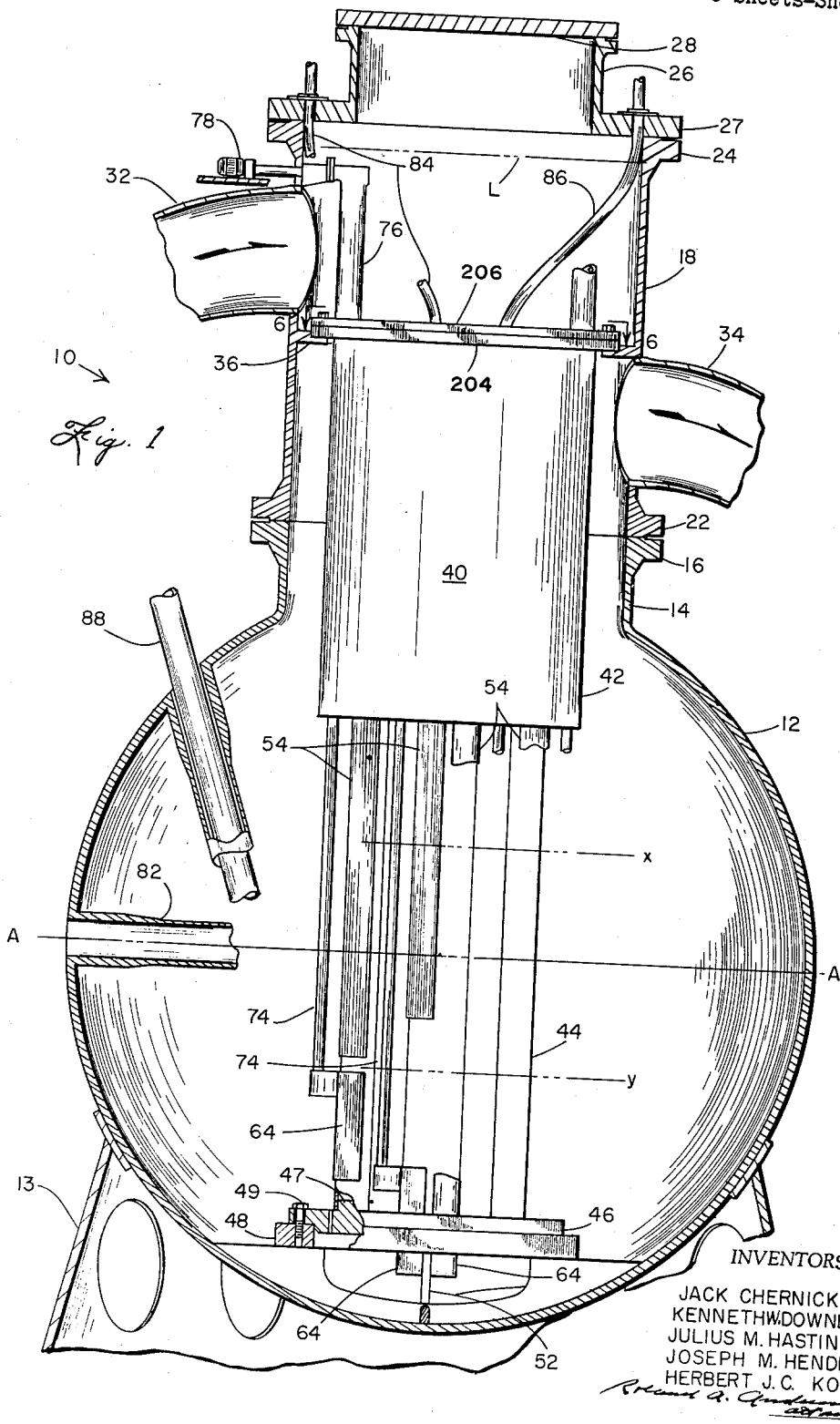
FIG. 1 is an elevation section view through the reactor vessel showing the internals of the reactor with control rod guides removed and control rods partially cut away.

Referring to FIG. 1 for details of the preferred embodiment of this invention, reactor 10 is seen to consist of a spherical vessel 12 supported by a skirt 13 and having a neck 14 terminating in a flange 16. Vessel 12 is made of suitable material such as aluminum. A cylindrical tube 18 with a flange 22 resting on flange 16 extends up from neck 14 and terminates in an upper flange 24. A top member 26 with a flange 27 sits on tube 18 and a fuel handling cover 28 closes the top opening of member 26. The various members may be bolted together at their flanges. Tube 18 is provided with an upper inlet nozzle 32 and a lower outlet nozzle 34 for the D$_2$O moderator, reflector and coolant contained within vessel 12. An annular shoulder 36 between nozzles 32 and 34 supports the removable internals 40 and, also, along with the top of internals 40, separates the incoming from the outgoing D$_2$O which circulates through vessel 12 as will be later more particularly described.

Internals 40 consist of an upper shroud 42 and a lower shroud 44, which extends down to a grid plate 46. The latter has an upper portion 47 extending into lower shroud 44, while plate 46 is supported on an annular ring 48. Bolts 49 may be used to attach grid plate 47 to ring 48. Vertical supporting plates 52, resting on the bottom of vessel 12 may support ring 48 and grid plate 47. Safety control rods 54, slidable along the outside of lower shroud 44, extend down from within upper shroud 42 while auxiliary control rods 64 extend up through slots provided in grid plate 46. Drive members 74 attached to auxiliary rods 64 are provided to move rods 64 in and out of position in a manner to be later more fully explained. Similar members (not shown) attached to rods 54 within upper shroud 42 perform the same function. The various drive members are geared through tubes 76 into motors 78 for selectively moving control rods 54 and 64 to control the reactivity of reactor 10. Guide members, shown in FIG. 5, mounted on lower shroud 44, are used to guide and maintain control rods 54 and 64 in proper positions at all times.

The mid-plane of reactor 10 is at A—A which is a plane passing through the center of the fuel containing or reactive portion of lower shroud 44. Phantom lines $x$—$x$ and $y$—$y$ show the upper and lower limits, respectively, of the fuel and comprises the core of reactor 10. Along mid-plane A—A are located the various beam tubes as illustrated by a portion of a tube 82 shown in FIG. 1, as well as other tubes and thimbles slightly above and below the plane A—A as to be described more particularly in connection with FIG. 2. Other thimbles such as the irradiation thimbles 84, 86 and 88 may extend down into reactor 10 at various locations for permitting a variety of other uses of reactor 10.

Figure 2:
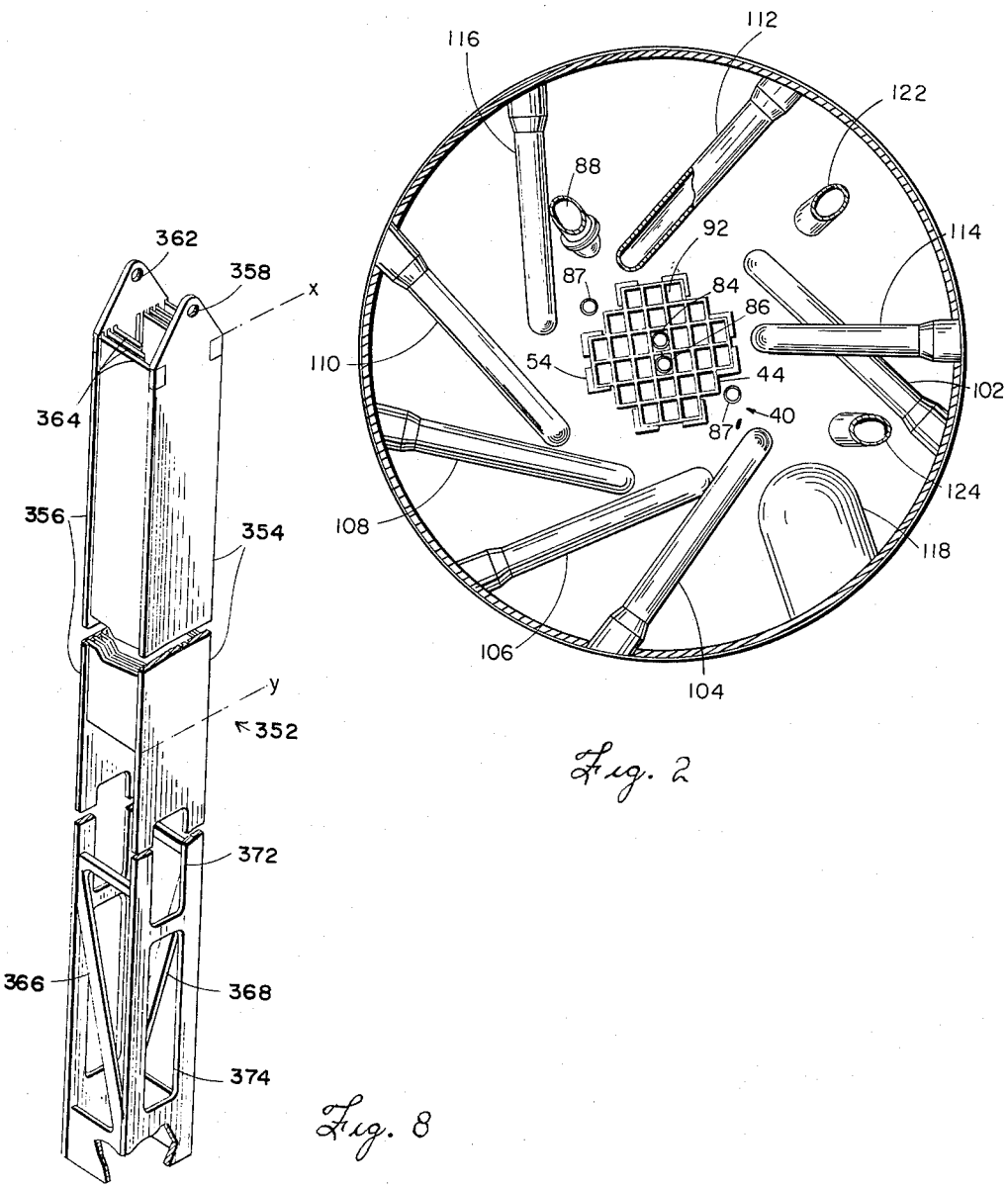
FIG. 2 is a plan section view through the reactor vessel above mid-plane A—A showing the reactor internals and the various neutron beam tubes.

Referring to FIG. 2, showing the arrangement of the various beam tubes and the core structure slightly above mid-plane A—A, lower shroud 44 is seen to be egg-crate shape in construction, consisting of thirty rectangular cells 92, some twenty-eight of which containing fuel elements (not shown) and in-core irradiation thimbles 84 and 86. Irradiation thimbles 87 and 87′ outside but adjacent to shroud 44 may also be used. The details of the construction of lower shroud 44 will be described later. Control rods 54 are shown in position, adjacent corners of shroud 44. Thermal beam tubes 102, 104, 106, 108 and 110 extending from the wall of vessel 12 are directed roughly tangential to core 40 so that the latter is not viewed directly. By being located away from and not facing the core of reactor 10, there is a reduction in the fast neutron and gamma backgrounds. Also, the thermal flux beam tubes 102, 104, 106, 108 and 110 are spaced from shroud 44 to have their ends coincide substantially at the peak thermal neutron flux, as shown by curve B in FIG. 3 to be described later in more detail. Actually, the tubes are slightly further way than the point of maximum flux, because the flux curve drops off gradually beyond the peak point as compared to a sharp drop on the inside of the peak. This orientation and spacing of the thermal beam tubes improves the signal-to-noise ratio of the beam by a factor of 20 to 30, with a reduction in thermal flux intensity of only 1.3. In addition to the thermal flux tubes, a fast beam tube 112, a fast chopper beam tube 114, and an intermediate beam tube 116 are provided. Tubes 112, 114 and 116 terminate closer to core 40 in order to obtain fluxes in the high energy levels as shown by curves I, II, III, and IV in FIG. 3.

In order to permit physically all of these tubes in the region about the core, they are actually placed some in the mid-plane, some slightly above, and some slightly below, as suggested by the overlapping tubes in FIG. 2. A cold beam tube 118 of extra large diameter permits a refrigerated moderator to be placed in the reflector region for the production of low energy, or "cold" neutron beam. Also shown is the reflector irradiation thimble 88, previously identified.

Figure 5:
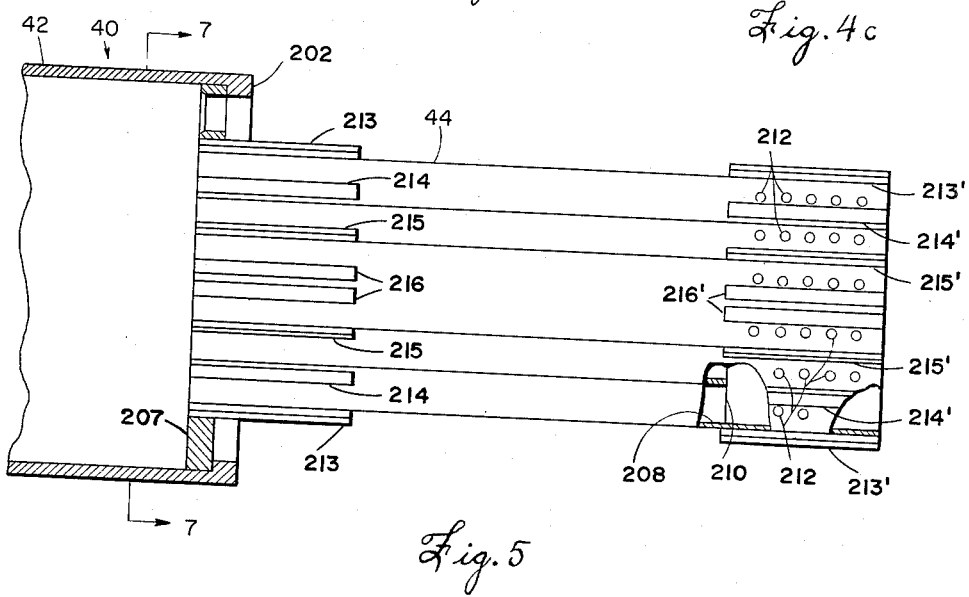
FIG. 5 is an elevation view, partially in section, of the core of the reactor shown in FIG. 1.

Referring to FIG. 5 for a detailed description of shrouds 42 and 44, it is seen that upper shroud 42 is cylindrical in shape terminating at its bottom in an inwardly facing annular lip 202 and, as shown in FIG. 1, terminates at the top in an annular flange 204 topped with a circular plate 206 to be later more particularly described in connection with FIG. 6. Returning to FIG. 5, lower shroud 44 is supported on annular lip 202 by a transition plate 207 resting therein. Plate 207 is welded or otherwise made integral with the remainder of shroud 44. The internal egg-crate construction of shroud 44 extends from the top of plate 207, forming rectangular passageways 208 shown sectioned in FIG. 5, down to 110 below which shroud 44 is hollow. A plurality of holes 212 through the outer walls of shroud 44 permit $D_2O$ passage out of this region as will be later seen. The $D_2O$ moderator flows down from inlet 32 into upper shroud 42 down into lower shroud 44 through the passageways 208 and the fuel assemblies and out holes 212. The bottom of lower shroud 44 is open, and, as shown in FIG. 1, when internals 40 are assembled into place, grid plate 46 has its upper portion 47 extend a short distance into the bottom opening of lower shroud 44. Upper portion 47 of plate 46 has vertical passageways (not shown) to permit $D_2O$ to flow out through the bottom of plate 46 as well. Guides 213, 213′, 214, 214′, 215, 215′, 216 and 216′ for the control rods 54 and 64 are attached to the outside of shroud 44 to insure proper alignment of the rods. These guides are better shown in FIGS. 6 and 7 to be now described.

Referring to FIG. 6, plate 206 is seen to be annular in shape with the egg-crate portion of lower shroud 44 shown below. Along the outer edge of plate 206 a plurality of holes 222 and openings for bolts 224 are provided, the latter for securing shroud 42 to ledge 36 of vessel 12. Holes 222 are for bolts (not shown) to secure internals 40 to ledge 36 as shown in FIG. 1. Along the inner edge of plate 206 a plurality of circular cut-outs 226 are provided to permit the drive connections for the various control rods to pass. Slots 228 permit passage of instrumentation leads and openings 232 permit irradiation thimbles to pass. Irradiation tubes 84 and 86, previously noted, are shown passing through plate 206 in cut-outs provided.

As best shown in FIG. 7, transition plate 207, set within shroud 42, is provided with a cut-out 244 for lower shroud 44 while circular cut-outs 246 with key-ways 247 for the control rod drives, and cut-outs 148 for the main control rods which extend up into upper shroud 42 are also provided. Transition plate 207 is integral with the egg-crate portion of lower shroud 44 and the tops of the control rod guides 213–216, as already noted. Lower lip 202 shown in FIG. 5 may be provided with bosses 252 to accommodate bolts 254 for securing transition plate 207 to upper shroud 42. Counter-sunk openings 256 and 258 in plate 207 are for the irradiation tubes 84 and 86 shown in FIG. 1, and counter-sunk openings 262, 264, 266 and 268 may be used for other type irradiation thimbles, test leads, or other auxiliary apparatus. Lower shroud 44 may be constructed of aluminum metal to improve heat transfer in the area and also because of this material's smaller neutron cross-section than some other materials.

As noted earlier, lower shroud 44 has thirty egg-crate positions twenty-eight of which contain fuel assemblies. A typical fuel assembly or element 352 is illustrated in FIG. 8. Element 352 is similar to the ETR fuel elements designed for Engineering Test Reactor described in report IDO–24020, available from the Office of Technical Services, U.S. Department of Commerce, but with an increased uranium loading. As shown in the drawing, each fuel element 352 is constructed of a pair of extended flat plates 354 and 356 wth supporting eyes 358 and 362 at the top thereof. A plurality of spaced flat fuel, aluminum clad plates 364 formed of an alloy of U-Al extend between slots in plates 354 and 356, from a point adjacent to the top of side plates 354 and 356 at plane $x$ to some intermediate point below at plane $y$. Thus the length of plates 364 is that of the distance between planes $x$ and $y$ which are also shown in FIG. 1 and previously described as defining the reactive portion of internals 40. Extending below plates 364 a pair of structural members 366 and 368 rigidly join side plates 354 and 356 which are provided with openings 372 and 374. It will be seen that with a plurality of fuel elements 352 set into the egg-crate shaped lower shroud 44, flow of coolant down into fuel element 352 between fuel plates 364 will pass out through the bottom of element 352, through side plates 354 and 356, and through structural members 366 and 368, and then through openings 312 in lower shroud 44 as well as openings in grid plates 47.

The flow of $D_2O$ moderator, coolant and reflector through reactor 10 is as follows: The $D_2O$ enters reactor 10 through inlet nozzle 32, filling up reactor to and maintaining level L shown in FIG. 1. The $D_2O$ enters the core through plate 206 filling up the interior of upper shroud 42 and passing through plate 207 into the egg-crate passages 208 in lower shroud 44. The $D_2O$ continues in and around fuel elements 352 and leaves lower shroud 44 through the side openings 212 and the openings in grid plate 47. The $D_2O$ then fills up vessel 12 up to shoulder 36 and leaves reactor 10 through outlet nozzle 34.

In the configuration of the reactor hereinabove described, the amount of $D_2O$ within lower shroud 44 is insufficient to fully moderate the core of this reactor, thus, the core is under-moderated. This results in a substantial portion of the fast neutrons leaving the core and entering the reflector region surrounding shroud 44 where most of the moderation in reactor 10 occurs. Hence, in the reflector region most of the thermal neutrons are produced and therefore enter the core again to continue the fission chain reaction.

Figure 4A:
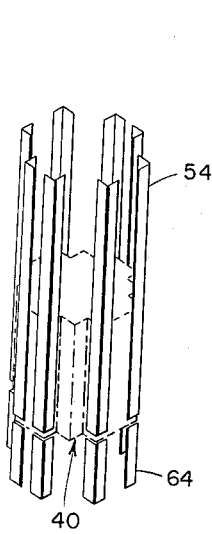
FIGS. 4a, 4b and 4c are schematic views of the core illustrating control rod positions around the core.
Figure 4B:
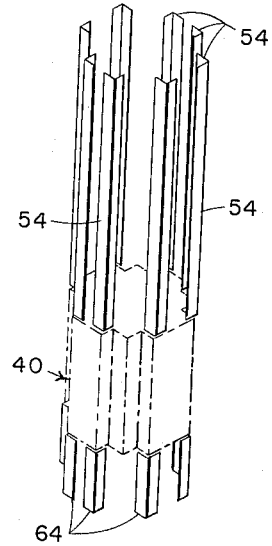
Figure 4C:
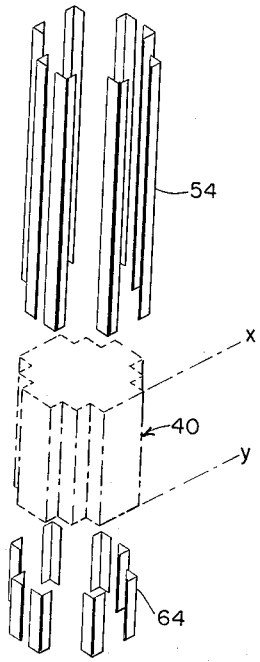

For the operation of the control rods, reference is made to FIGS. 4a, 4b and 4c. As was noted in connection with FIG. 1, the fueled portion of reactor 10 is located between the planes $x$ and $y$, which are also shown in FIG. 4c. In FIG. 4a, all the control rods 54 and 64 are shown in their reactor shut-down position around the core. In FIG. 4b, the rods are shown in the critical position for the core, with rods 54 withdrawn, so that the inner ends of rods 54 and 64 terminate at the $x$ and $y$ plane, respectively, equidistant from mid-plane A—A. In operation, as shown in FIG. 4c, all of rods 54 and 64 are moved simultaneous as a shutter, their inner ends always equidistant from mid-plane A—A. In the particular embodiment of reactor 10 being described, only main rods 54 are designed to drop on a scram signal, down to their position shown in FIG. 4a. While all of the rods in each of the groups of the main and auxiliary rods are ganged to each other for movement as just described, they may of course be connected for independent movement if desired. This shutter type arrangement of the control rods has the advantage of causing minimum flux pertubation at mid-plane A—A where the thermal flux beam tubes are located and where it is desired to maintain stable flux values during periods when the tubes are being used.

It will be apparent from the description of reactor 10 and its appearance in FIG. 2, that maximum power within the core will occur in the fuel elements furthest away from the center and most closely situated with respect to the moderator, that is, the corner fuel elements. Thus, these are the fuel elements having the control rods mounted closely adjacent thereto. Consequently, in the particular location of the control rods, the most effective reactor control may be exercised. Furthermore, it is also apparent that the outer fuel elements, especially those just referred to, suffer the most rapid burn-up. This compares with other, more conventional reactors in which maximum burn-up occurs in the center fuel elements where also are found maximum thermal fluxes and power development. This reactor, by the particular arrangement just described, may be described as a typical reactor turned inside out in this respect with the result that thermal flux peaks occur outside the core where they can be tapped with minimum flux pertubation. Furthermore, this construction provides a spatial distribution of the flux peaks in the various energy levels, thereby permitting to an extent not heretofore found possible the irradiation of targets by neutron fluxes in particular energy levels unmixed or uncontaminated by neutron flux at other energy levels.

Figure 3:
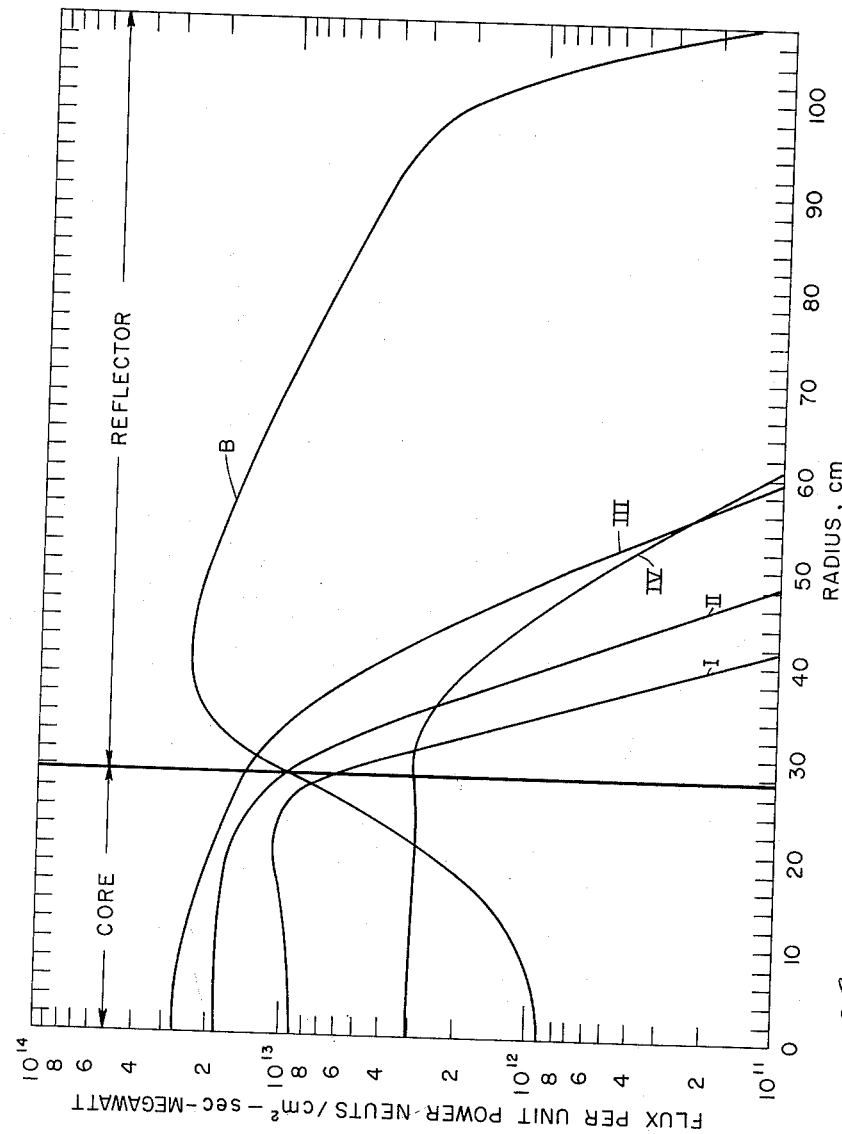
FIG. 3 shows curves of neutron fluxes in various energy levels distributed in the reactor substantially at mid-plane.

The aforementioned spatial distribution of neutron flux peaks is demonstrated in FIG. 3, already briefly alluded to. Table I indicates the neutron energy groups designated by the curves in FIG. 3.

Table I

| Curves: | Energy groups |
| --- | --- |
| I | 10 mev.–.302 mev. |
| II | 302 kev.–9.19 kev. |
| III | 9.19 kev.–4.56 ev. |
| IV | 4.56 ev.–.2775 ev. |
| B (thermal) | Less than 0.2775 ev. |

It will be noted that the peak thermal flux (curve B) occurs outside of the core at a point where the neutron fluxes at other energy levels (epithermal fluxes) have dropped off considerably, thereby permitting experiments with these neutrons with minimum background of neutrons at the other energy levels. Similarly, irradiation carried on within the core itself insures a minimum background of thermal neutrons.

The control and operation of reactor 10 is accomplished in accordance with established techniques. The main and auxiliary control rods 54 and 64 are moved as hereinbefore described to obtain the desired criticalities.

In Table II are listed the characteristics of a preferred embodiment of the high flux beam reactor in accordance with this invention.

It is thus seen that there has been provided a nuclear reactor of unique design in which higher intensity external neutron beams with lower background intensities are produced. While a preferred embodiment of the reactor has been particularly described, it is understood that many variations and alterations may be made without departing from the scope of this invention.

Table II

| | |
| --- | --- |
| Power range | 20–40 mw. (thermal). |
| Neutron flux: | |
|    Core, total epithermal [1] | $1.6 \times 10^{15}$ cm.$^{-2}$ sec.$^{-1}$. |
|    Reflector thermal flux, max. [1] | $7 \times 10^{14}$ cm.$^{-2}$ sec.$^{-1}$. |
| Materials: | |
|    Coolant, moderator and reflector | $D_2O$. |
|    Fuel | U–235–Al alloy. |
|    Core structure, beam tubes, vessel | 6061 aluminum. |
| Fuel element, ETR type: | |
|    Uranium concentration in meat alloy | 30 wt. percent. |
|    Meat and Clad thicknesses | .020 and .015 in. |
|    Fuel region dimensions (element) | 2.6 x 3.0 x 21.0 in. |
|    U–235 loading per element | 260 gm. |
| Core details: | |
|    Number of fuel elements | 28. |
|    Core volume | 86 liters. |
|    Total U–235 loading | 7.28 kgm. |
|    Water-to-metal volume ratio | 1.23. |
| Process design parameters: | |
|    Primary system design pressure [1] | 250 p.s.i.g. |
|    Primary loop pressure drop [1] | 55 p.s.i. |
|    $D_2$ flow rate [1] | 17,600 g.p.m. |
|    Velocity in fuel channels [1] | 35 ft./sec. |
|    Core inlet temperature | 120° F. |
|    Average heat flux [1] | 387,000 B.t.u./hr.-ft.$^2$. |

[1] Values appropriate for 40 mw. power.

What we claim is:

1. A heavy water moderated neutronic reactor for producing external beams of high flux thermal neutrons comprising a vessel for containing heavy water, removable internals submerged in said water having a core of highly enriched uranium fuel elements, inlet means in said vessel above said internals for supplying said heavy water, outlet means in said vessel below the top of said internals for withdrawing said heavy water, means within and attached to said vessel for supporting said internals and separating incoming from outgoing heavy water, said means including passageways for passing water from said inlet means down through said core to fill said vessel and pass out through said outlet means, said passageways carrying heavy water through and around said fuel elements in amounts resulting in the under-moderation of said core, said pressure vessel enclosing a reflector consisting of a volume filled by flowing heavy water surrounding said core to fully moderate said core and establish maximum thermal flux outside of said core, a plurality of control rods extending along the outer surface of said internals for movement along said outer surface toward and away from the core of said internals for exercising nuclear control over said reactor, and means for extracting from said reactor beams of thermal neutrons.

2. The reactor of claim 1 in which the last-named means consists of at least one tube extending through said pressure vessel into said reflector substantially tangential to said core and terminating substantially at the maximum thermal flux for exposure to said thermal neutrons with minimum noise background.

3. The reactor of claim 1 in which said control rods consist of at least one pair of upper and lower rods axially aligned and arranged for movement perpendicularly to the mid-plane of said fuel elements, said mid-plane being a plane passing through the center of reactivity of said fuel elements, the innermost positions of said rods for control purposes being the upper and lower limits, respectively, of said fuel elements.

4. The reactor of claim 3 in which said upper control rod is additionally capable of being moved down to the lower limit of said fuel elements for shutting down said reactor.

5. A neutronic reactor for producing high flux thermal neutron beams containing a core of highly enriched uranium moderated by a heavy water moderator, means for circulating said heavy water through and around said core and establishing a reflector region consisting of said heavy water surrounding said core, the latter said means distributing said heavy water in and around said core to under-moderate the latter and establish thermal neutron flux peaks in said reflector region and epithermal neutron flux peaks within said core, and a plurality of adjustable control rods mounted exclusively for movement outside of said core adjacent locations of maximum power generation for regulating the operation of said reactor.

6. The reactor of claim 5 in which said heavy water additionally functions as the coolant for said reactor.

7. The reactor of claim 5 in which means are provided for extracting thermal neutrons from said pressure vessel consisting of at least one hollow beam tube extending through said pressure vessel substantially tangent to said core and terminating at a point substantially at a peak in said thermal neutron flux, said beam tube being disposed in a plane passing through the center of reactivity of said core.

8. A neutronic reactor for producing high flux thermal neutron beams containing a core of highly enriched uranium surrounded by and externally moderated by heavy water moderator for establishing thermal flux peaks outside of said core, said core having upper and lower limits and a mid-plane through the center of reactivity, a plurality of elongated control rods mounted on axes extending along the outer periphery of said core, said axes being perpendicular to said mid-plane, said control rods consisting of upper and lower control rods, means for selectively positioning said lower control rods along their respective axes between positions to and away from the lower limit of said core for controlling the normal operation of said reactor, means for selectively positioning said upper control rods along their respective axes between positions to and away from the upper limit of said core for controlling the normal operation of said reactor, the last-named means also being capable of positioning said upper control rods along their respective axes between said lower and upper limits for closing down operation of said reactor, and hollow neutron beam tubes located in planes closely above and below and parallel to said mid-plane outside of said core, said tubes extending along axes parallel to and spaced from axes tangent to the periphery of said core, each of said beam tubes beginning at a point opposite to its respective point of tangency and extending out of said pressure vessel, the spacing of said beam tubes away from said periphery being such that the beginning of each tube substantially coincides with the peak of said flux.

References Cited in the file of this patent

UNITED STATES PATENTS

| | | |
|---|---|---|
| 2,921,007 | Spindrad | Jan. 12, 1960 |
| 2,938,844 | Graham et al. | May 31, 1960 |
| 2,938,847 | Yeomans | May 31, 1960 |
| 2,975,117 | Zinn | Mar. 14, 1961 |
| 2,986,510 | Wigner et al. | May 30, 1961 |